United States Patent [19]

Yanagihara et al.

[11] Patent Number: 5,125,235
[45] Date of Patent: Jun. 30, 1992

[54] SUPERCHARGED LEAN BURN INTERNAL COMBUSTION ENGINE

[75] Inventors: Hiromichi Yanagihara; Teruo Kumai, both of Gotenba; Taiichi Mori, Susono, all of Japan

[73] Assignee: Toyota Jidosha Kabushiki Kaisha, Toyota, Japan

[21] Appl. No.: 535,717

[22] Filed: Jun. 11, 1990

[30] Foreign Application Priority Data

Jun. 21, 1989 [JP] Japan .................................. 1-156685

[51] Int. Cl.⁵ .................................. F02D 23/02
[52] U.S. Cl. .................................. 60/605.1; 60/611; 123/492
[58] Field of Search .............. 60/601, 603, 605.1, 60/611; 123/442, 492, 559.1

[56] References Cited

U.S. PATENT DOCUMENTS

| | | | |
|---|---|---|---|
| 4,400,944 | 8/1983 | Iwamoto et al. | 60/605.1 |
| 4,408,585 | 10/1983 | Stuckas | 123/489 |
| 4,450,814 | 5/1984 | Sawamoto et al. | 60/605.1 |
| 4,873,961 | 10/1989 | Tanaka | 60/601 |

FOREIGN PATENT DOCUMENTS

| | | |
|---|---|---|
| 91359 | 3/1983 | European Pat. Off. . |
| 3045590 | 6/1981 | Fed. Rep. of Germany . |
| 51390 | 2/1942 | France . |
| 72239 | 6/1981 | Japan .................. 60/605.1 |
| 38345 | 3/1983 | Japan .................. 123/559.1 |
| 58-59327 | 4/1983 | Japan . |
| 58-72631 | 4/1983 | Japan . |
| 153532 | 7/1987 | Japan .................. 60/605.1 |
| 62-54976 | 11/1987 | Japan . |
| 62-54977 | 11/1987 | Japan . |

Primary Examiner—Michael Koczo
Attorney, Agent, or Firm—Kenyon & Kenyon

[57] ABSTRACT

A turbocharged internal combustion engine for a spark ignition internal combustion engine using gasoline as the fuel is disclosed. An intake system is constructed for the generation of a homogeneous flow of the intake air. The turbocharger is constructed to obtain a ratio of a pressure at the output to the pressure at the input higher than at least 1.5. A lean combustible mixture is obtained at a high engine load or engine speed area whereat the turbocharger can obtain a full supercharging ability. A relationship between the degree of supercharging is such that the larger that value of the air-fuel ratio, the higher the intake pressure. A high fuel consumption efficiency is obtained while preventing an excessive increase of the exhaust gas temperature.

7 Claims, 9 Drawing Sheets

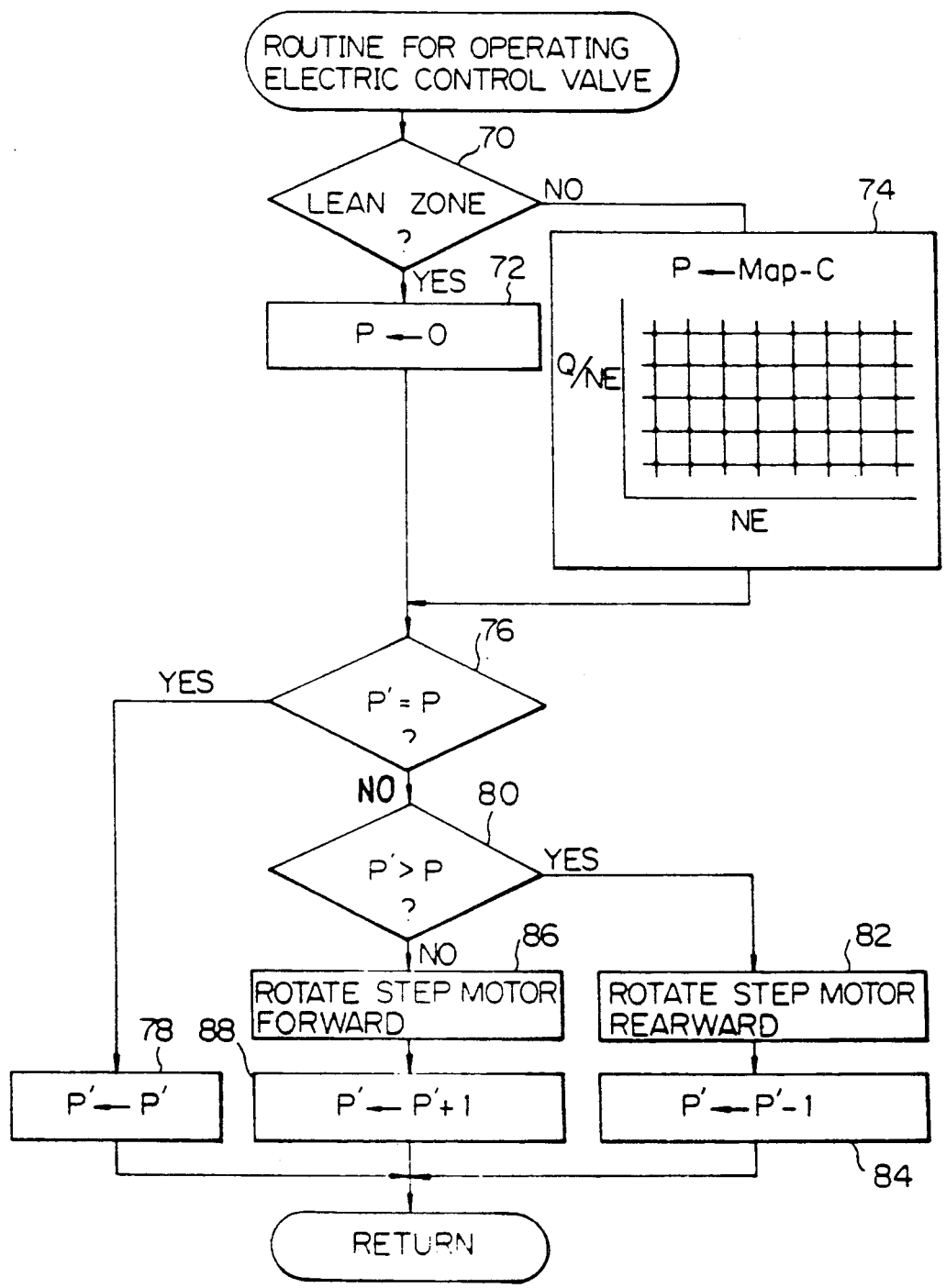

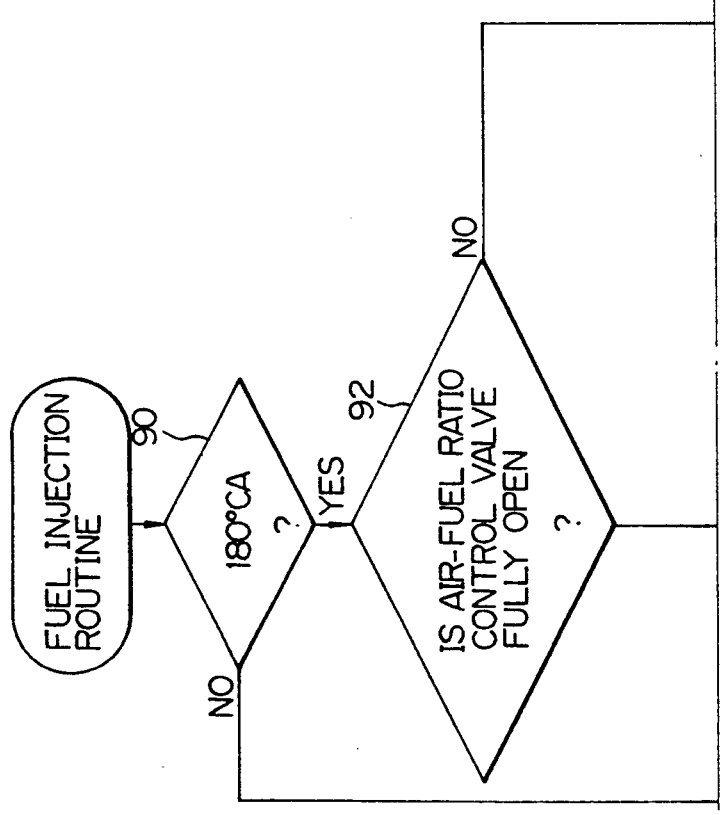

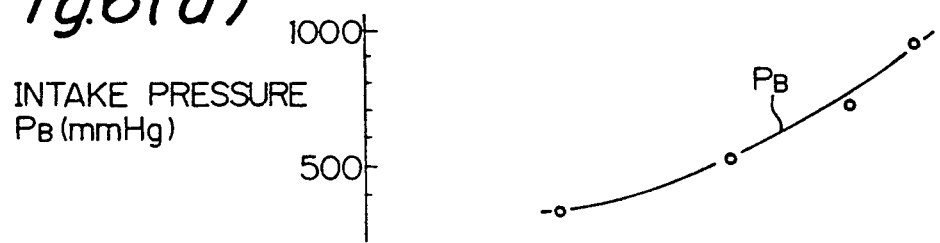
Fig.6(a) INTAKE PRESSURE P_B (mmHg)
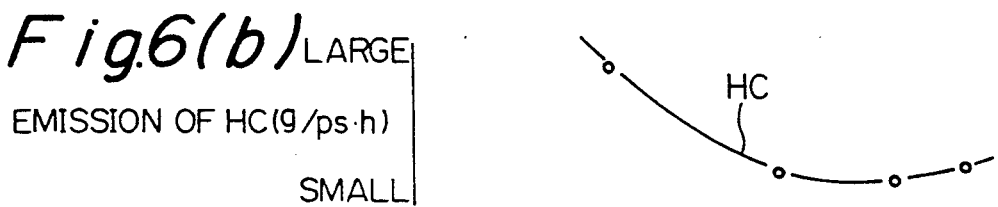
Fig.6(b) EMISSION OF HC (g/ps·h)
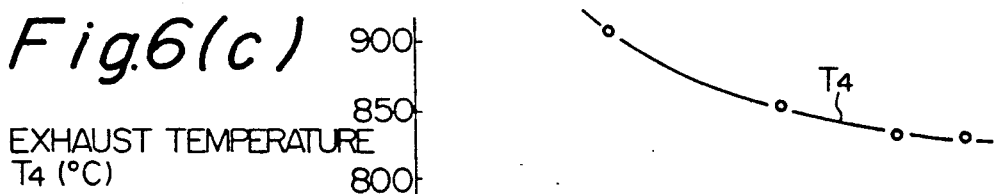
Fig.6(c) EXHAUST TEMPERATURE T4 (°C)
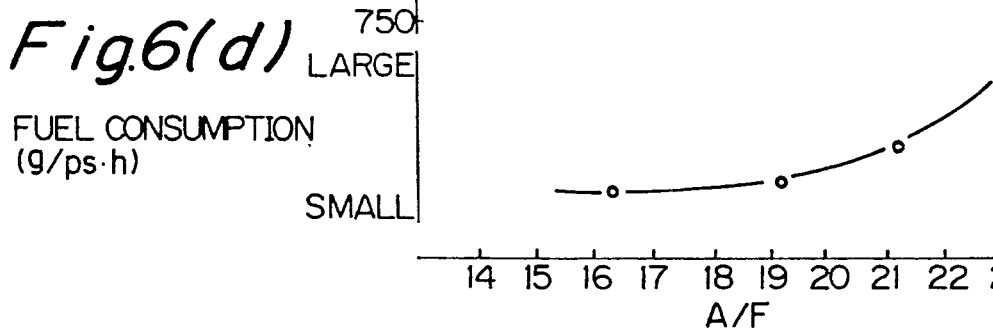
Fig.6(d) FUEL CONSUMPTION (g/ps·h)

LOW AIR DENSITY

HIGH AIR DENSITY

SUPERCHARGED LEAN BURN INTERNAL COMBUSTION ENGINE

BACKGROUND OF THE INVENTION

1. Field of the Invention

The present invention relates to a supercharged internal combustion engine, and more particularly to a supercharged internal combustion engine wherein an air-fuel ratio on the lean side with respect to the theoretical (stoichiometric) air-fuel ratio is obtained when the engine is in a supercharging state.

2. Description of the Related Art

In a lean burn internal combustion engine using gasoline as the fuel for example, as disclosed in Japanese Unexamined Patent Publication No. 58-59327, a lean air-fuel ratio value with respect to the theoretical air-fuel ratio is obtained. To obtain a stabilized combustion of the lean air-fuel ratio, a stratification of the combustible mixture is created in a combustion chamber so that a rich portion is formed adjacent to the electrodes of a spark plug, which rich air-fuel mixture portion is easily ignited, and a flame thus generated is extended to cause a burning of a lean portion located around the rich portion. In such a known type lean burn system, a lean air-fuel mixture value of the air-fuel mixture of between 18 to 22 is obtained when the engine is under a low load. When the engine load is increased to a medium load zone, a combustible mixture of a theoretical air-fuel ratio or a lean air-fuel ratio near to the theoretical air-fuel ratio, of between 15 to 17, is formed to obtain a desired engine performance. When the engine load is in a high load zone, such a theoretical air-fuel ratio or lean air-fuel ratio near to the theoretical air-fuel ratio of between 15 to 17 allows an easy increase of the exhaust temperature, and thus a catalytic converter is apt to be excessively heated. To prevent an excessive increased of the exhaust temperature, the air-fuel ratio is controlled to a rich air-fuel ratio of, for example, between 10 to 11. See Japanese Examined Patent Publication No. 62-54977.

In the prior art stratified lean combustion engine, a rich air-fuel ratio is obtained at a engine high load operation, to prevent an excessive heating of the catalytic converter, but this rich air-fuel mixture lowers the fuel consumption efficiency.

The excessive temperature of the catalytic converter is prevented if an air-fuel ratio of, for example, 20, which is outside the range wherein the excessive exhaust gas temperature occurs, is used, but such an extremely lean air-fuel ratio, although not providing an excessive increase of the temperature, easily causes the combustion of the combustible mixture to become unstable, which lowers the engine output performance.

SUMMARY OF THE INVENTION

A object of the present invention is to provide an internal combustion engine capable of obtaining a stable lean combustion while preventing an overheating of the catalytic converter.

Therefore, according to the present invention, there is provided a supercharged spark ignition internal combustion engine, comprising:

an engine body;

an intake line for supplying intake air to the engine body;

means for supplying fuel into the intake line to generate a combustible mixture;

the intake line being adapted for a generation of a homogeneous flow of a combustible mixture introduced into the engine body;

supercharging means arranged in the intake line for forcibly supplying the intake air into the engine;

an exhaust line for removing resultant exhaust gas from the engine body; and, means for controlling an amount of fuel supplied from said supply means to the intake line in such a manner that a lean air-fuel mixture is obtained at an engine operating area at which the supercharger can obtain a required supercharging ability.

BRIEF DESCRIPTION OF THE DRAWINGS

FIGS. 2 and 3A, 3B are flowcharts illustrating the operation of the control circuit in FIG. 1;

FIGS. 6($a$), ($b$), ($c$) and ($d$) show the supercharging pressure, amount of HC emissions, exhaust temperature, and fuel consumption, respectively, with respect to the air-fuel ratio; and, FIGS. 7($a$) and ($b$) show schematically the arrangement of fuel particles in unit volume of gas of low and high density, respectively.

DESCRIPTION OF THE PREFERRED EMBODIMENT

Figure 1:
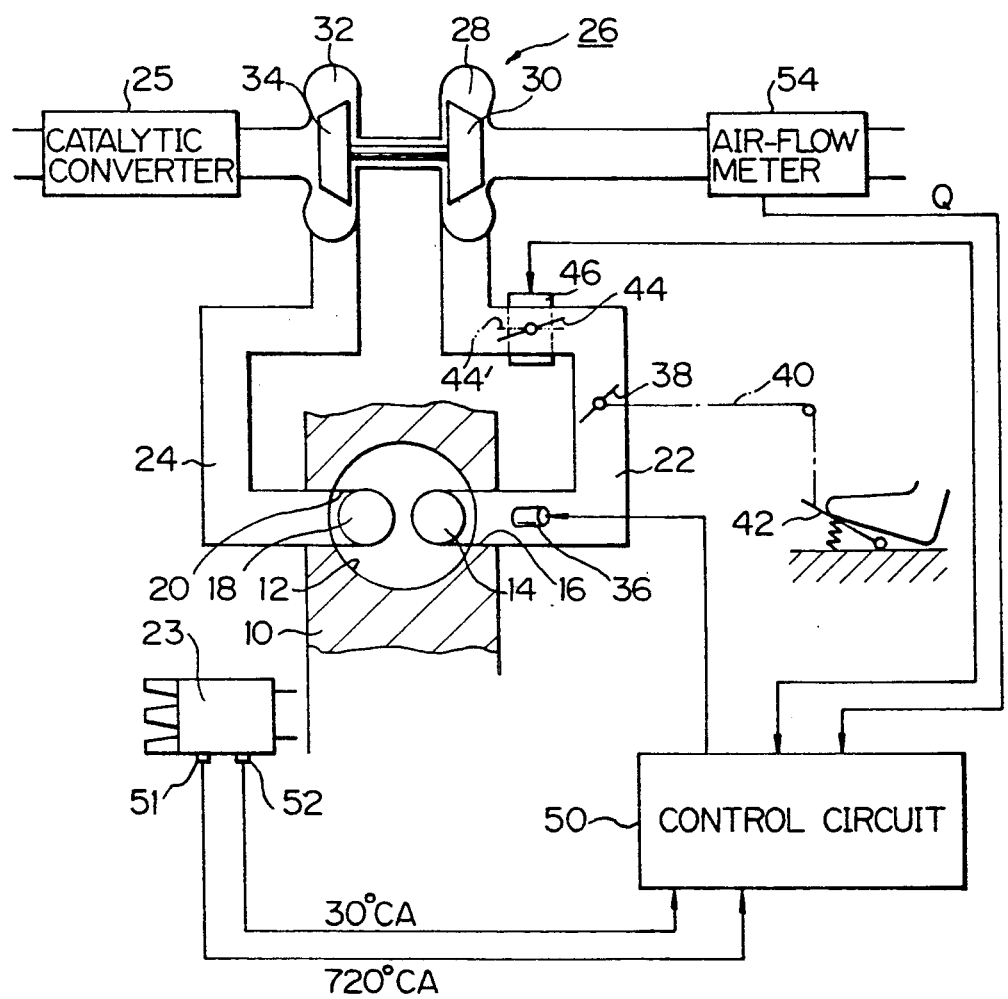
FIG. 1 schematically and generally shows an internal combustion engine according to the present invention.

In FIG. 1 a multi-cylinder internal combustion engine having, for example, four cylinders, includes a body 10 in which are formed a cylinder bore 12, an intake valve 14, and a intake port 16. The intake port 16 is of a straight type and generates a homogeneous combustible mixture in the cylinder bore 12 during the intake stroke when the intake valve is open. The internal combustion engine is further provided with an exhaust valve 18 and an exhaust port 20. The intake port 16 is connected to an intake pipe 22, the exhaust port 20 is connected to the exhaust pipe 24, and a catalytic converter 25 is arranged in the exhaust pipe 24. Reference numeral 23 denotes a distributor.

A turbocharger 26 as a supercharger is provided, and includes a compressor housing 28 connected to the intake pipe 22, a compressor wheel 30 arranged in the compressor housing 28, a turbine housing 32 connected to the exhaust pipe 24, and a turbine wheel 34 arranged in the turbine housing 32. This turbocharger 26 can obtain a greater supercharging effect than that obtained by a usual turbocharger. The usual design of the turbocharger operated under a theoretical air-fuel ratio has a supercharging ability such that it provides, with respect to an atmospheric pressure, an increase in the intake pressure of a value of between 300 mmHg to 450 mmHg, which corresponds to a pressure ratio of at most 1.5, which is a ratio of the pressure at the outlet of the turbocharger to the pressure at the inlet thereof. Contrary to this, the turbocharger 26 according to the present invention has a supercharging ability such that it provides, with respect to an atmospheric pressure, an increase in the intake pressure of a value of between 700 mmHg to 1100 mmHg, which corresponds to a pressure ratio larger than 1.5, preferably between 2 to 2.5. In the usual type of engine, an upper value of the supercharging pressure is limited to a relatively low value because otherwise the exhaust temperature is easily increased and knocking easily generated. According to the present invention, the setting of the lean air-fuel ratio in the engine high load condition can prevent an excessive increase of the exhaust temperature, and the setting of a high supercharging pressure allows a stable combustion of the lean air-fuel mixture to be obtained. It should be noted that a device for cooling the intake air, such as an intercooler, may be arranged downstream of the compressor wheel 30 of the turbocharger 26.

A fuel injector 36 is arranged in the intake passageway 22, adjacent to the intake port 16. It should be noted that the present invention can be realized not only in a fuel injection type engine but also in a carburetor type engine.

The throttle valve 38 is connected to an accelerator pedal 42 by a cable 40 and an air-fuel ratio control valve 44, which is an electrically operated butterfly type valve, is arranged in the intake passageway 22 upstream of the throttle valve 38. The air-fuel ratio control valve 44 is operated in response to the switching of the setting of the air-fuel ratio between a lean air-fuel ratio when the engine is in a high load condition and a theoretical air-fuel ratio when the engine is in a low load condition. When the engine is in a high load condition and the setting of the air-fuel ratio is lean, the air-fuel ratio control valve is fully open as shown by a dotted line 44′. Contrary to this, when the engine is in a low load condition and the air-fuel ratio is set at the theoretical air-fuel ratio, the air-fuel ratio control valve 44 is partly closed, as shown by the solid line. The provision of the air-fuel ratio control valve 44, which is moved step-wise between the fully open position and the partly closed position, allows the amount of fuel to be maintained at the same value at the switching zone between the lean air-fuel ratio and theoretical air-fuel ratio, whereby a smooth operation is realized without a rapid change in the engine output torque. The air-fuel ratio control valve 44 is connected to a step motor 46, as an actuator, but any type of actuator can be employed for operating the air-fuel ratio control valve 44, if able to move it between the fully open position (dotted line) and the partially closed position (solid line).

A control circuit 50 constructed as a microcomputer system is adapted for controlling the fuel injector 36 and the air-fuel ratio control valve 44, and various sensors, which will be explained hereinbelow, are connected to the control circuit 50. Crank angle sensors 51 and 52, which are mounted on the distributor 23, are connected to the control circuit 50. The first crank angle sensor 51 is used for obtaining a reference position of the crankshaft, and outputs a pulse signal for every completion of one complete engine cycle, i.e., a 720 degrees rotation of the crankshaft, and the second crank angle sensor 52 is used for detecting the engine speed and outputs a pulse signal for every 30 degrees rotation of the crankshaft. Reference numeral 54 is an air flow meter for measuring the amount of intake air introduced into the engine; a sensor for detecting the degree of depression of the accelerator pedal 42 or the intake pressure may be employed instead of the air flow meter 54. The control circuit 50 executes calculations based on operating condition signals from these sensors, to obtain a desired fuel injection control.

The operation of the control circuit 50 is described with reference to the flowcharts shown in FIGS. 2 and 3. FIG. 2 shows a flowchart for executing the control of the air-fuel ratio control valve 44, which routine is executed at predetermined intervals. At step 70, it is determined if the engine is in a running area at which the air-fuel ratio should be controlled to the lean side.

Figure 4:
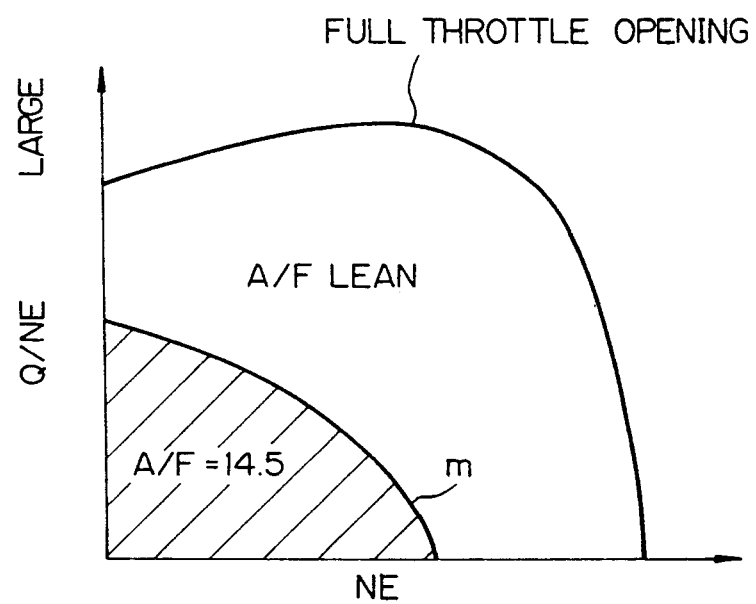
FIG. 4 shows the setting of the air-fuel ratio according to the present invention.
Figures 5A, 5B, 5C, 5D:
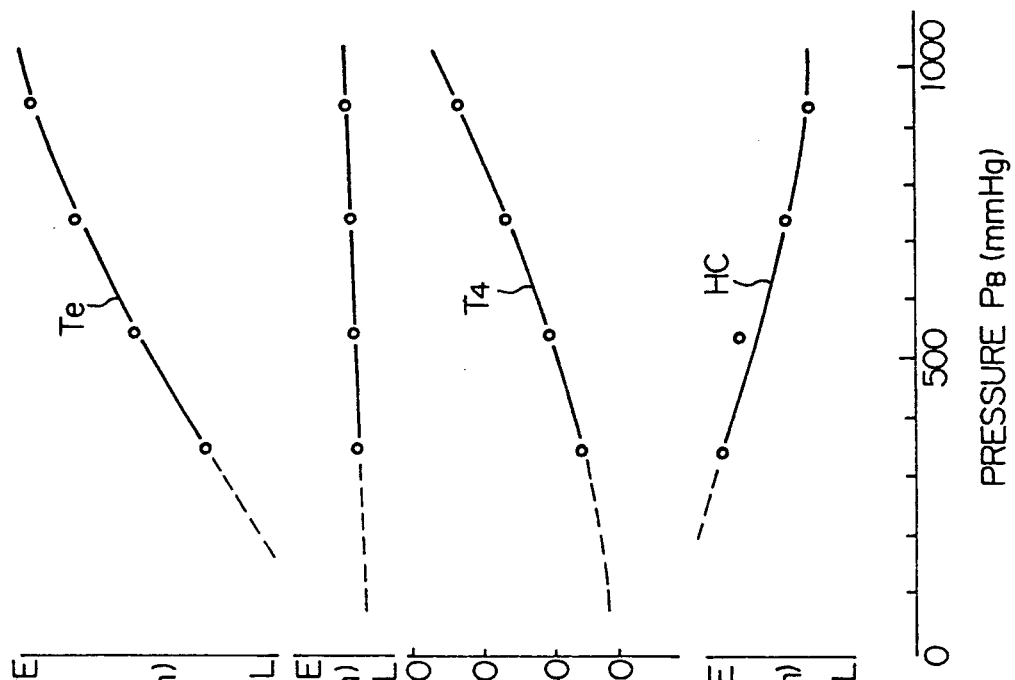
FIGS. 5($a$), ($b$), ($c$) and ($d$) show the engine torque, fuel consumption, exhaust temperature, and amount of emissions of HC components, respectively, with respect to the supercharging pressure.

FIG. 4 schematically illustrates the setting of the air-fuel ratio with respect to the engine running condition wherein a line m is a boundary line between an area at which a lean air-fuel ratio control is obtained, and an area at which a theoretical air-fuel ratio control is obtained. Namely, in the area above the line m (high speed and high engine load area), the air-fuel ratio is controlled to a lean value, and conversely, in the area below the line m (low speed and low engine load area), the air-fuel ratio is controlled to the theoretical air-fuel ratio. As will be fully explained later a feature of the present invention is that a very strong supercharging is carried out to provide a lean combustion during the engine high load condition. To obtain this very strong supercharged condition, a turbocharger having a large volume is employed, and the employment of a large volume turbocharger usually causes a lowering of the supercharging pressure during the engine low speed or low load condition to a pressure too low to obtain a necessary supercharging pressure corresponding to the supercharging ratio, which is at least equal to 1.5. Therefore, the lean setting of the air-fuel ratio is obtained only when the engine is under the high speed and high load condition. Nevertheless, when such a supercharging system, which can obtain a sufficiently high supercharging pressure during the low engine speed and low load condition, is employed, the lean air-fuel ratio operation can be carried out even if the engine is under the low speed and low load condition.

When it is determined at step 70 that the engine is in the lean air-fuel ratio zone, the routine goes to step 72 and the target position P of the air-fuel ratio control valve is set to zero. The position P=O corresponds to the reference axis position of the step motor 46, which positions the air-fuel ratio control valve 44 as shown by the dotted line 44′ (fully open position of the valve 44) in FIG. 1. When it is determined that the engine is in the theoretical air-fuel ratio control zone, the routine goes to step 74 where the target position P of the air-fuel ratio control valve 44 is calculated from a map Map-C. This map is used for determining the degree of throttling of the intake air amount which, upon a change of the engine condition between the lean control area (high load area) and the theoretical air-fuel ratio area (low load area), can change the air-fuel ratio between a lean side value and the theoretical air-fuel ratio value without abruptly changing the amount of the fuel to be injected. The amounts of fuel injected on the fuel injection amount map Map-A for obtaining the lean air fuel mixture and the fuel injection amount map Map-B are the same as on the switching line m, where the switching of the maps occurs, if the combination of the values of the engine speed NE and the engine load is the same. Nevertheless, the amount of intake air which can provide the theoretical air-fuel ratio, such as 14.5, is changed in accordance with the engine speed and the ratio of the intake air amount to the engine speed, Q/NE. The map Map-C stores, with respect to the values of the engine speed and the ratio of the intake air amount to the engine speed as the engine load parameter, the data of shaft rotary angle position P of the step motor 46 corresponding to the opening of the air-fuel ratio control valve 44 necessary to change the air-fuel ratio from the lean air-fuel ratio to the theoretical air-fuel ratio. Then, at step 74, a map interpolation calculation is carried out to obtain a value of the step motor position P corresponding to the engine speed NE and ratio of the intake air amount to the engine speed, Q/NE. At step 76 it is determined if the detected position P' of the step motor 46 and the map calculated position P of the step motor 46 match. When it is determined that a position matching (P'=P) is obtained, the routine goes to step 78 and the value of P' is maintained. When it is determined that there is an inconsistency, the routine goes to step 80 and it is determined if P'>P, i.e., the present position P' of the step motor 46 is further advanced with respect to the target position P. When it is determined that P'>P, i.e., the present position P, of the step motor 46 is further advanced with respect to the target position P, the routine goes to step 82 and a one step rotation of the step motor 46 in the reverse direction is carried out. The reverse direction corresponds to the direction of movement of the air-fuel ratio control valve 44 for opening the air-fuel ratio control valve 44. At step 84, the value P' is determined and when it is determined that P'≦P, i.e., the present position P' of the step motor 46 is retarded with respect to the target position P, the routine goes to step 86 and a one step rotation of the step motor 46 in the forward direction is carried out. The forward direction corresponds to the direction of movement of the air-fuel ratio control valve 44 for closing the air-fuel ratio control valve 44. Then at step 88, the value P' is incremented. As a result of the feedback control at steps 76 to 88, the target position of the air-fuel ratio control valve 44 can be obtained.

Figure 3B:
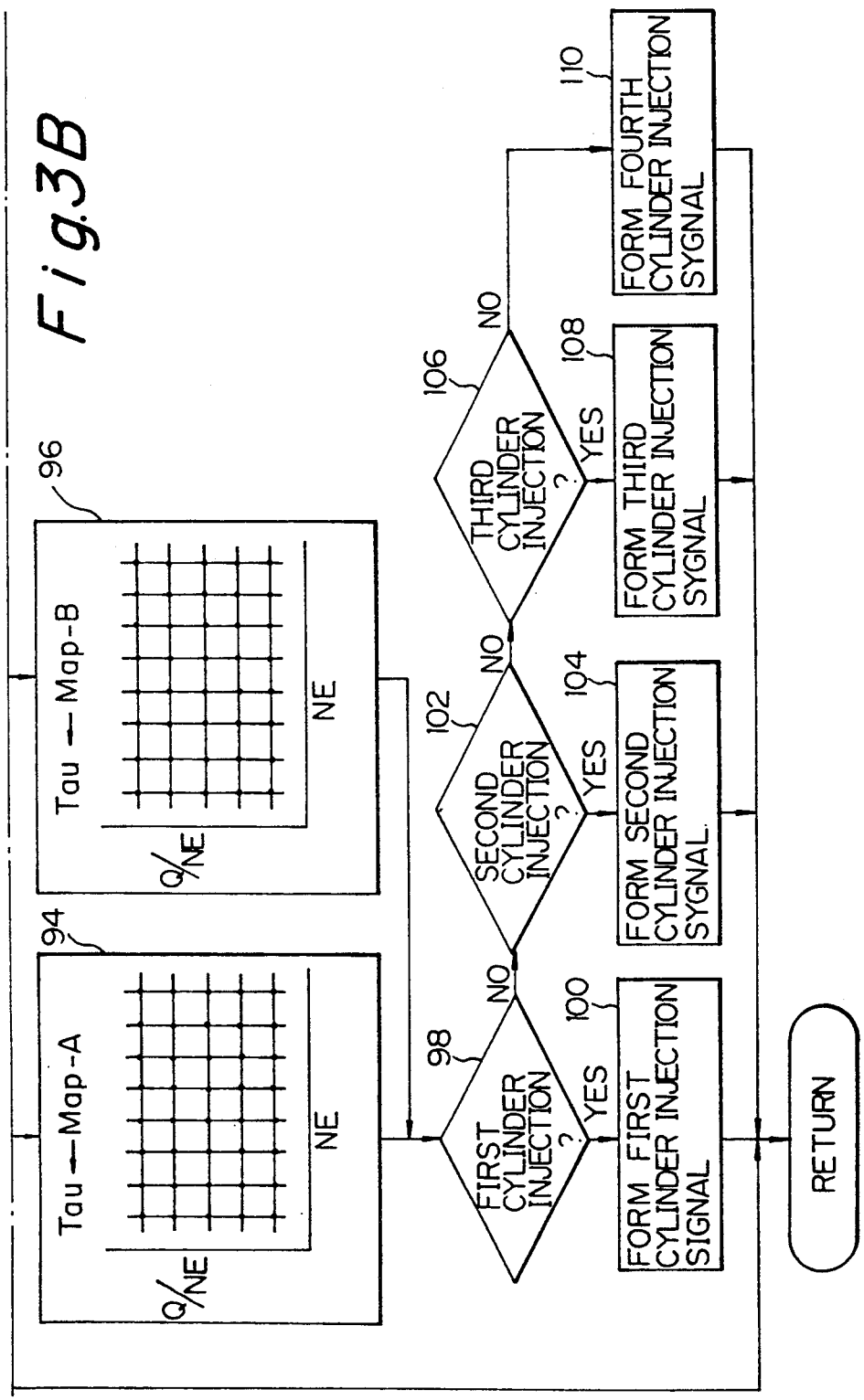

FIG. 3 shows a fuel injection routine, which is commenced upon receipt of each 30 degree signal from the second crank angle sensor 52. At step 90, it is determined if a 180 degrees rotation of crankshaft is obtained after the previous execution of the calculation of the fuel injection amount. Namely, this embodiment is applied to a four cylinder internal combustion engine, and therefore, the fuel injection operation is carried out at every 180 degrees rotation of the crankshaft. When it is determined that the 180 degrees rotation of the crankshaft is obtained at step 90, the routine goes to step 92 and it is determined if the air-fuel ratio control valve 44 is fully open, i.e., the air-fuel ratio control valve 44 is in a position as shown by the phantom line 44', where the engine should be in a zone at which the air-fuel ratio is controlled to the lean air-fuel ratio mixture. When it is determined that the air-fuel ratio control valve 44 is fully open, i.e., the engine is now in a condition whereat the lean air-fuel mixture should be obtained, the routine goes to step 94 and a map interpolation calculation of the fuel injection amount T is carried out, based on a first map Map-A. This map Map-A for the fully open condition of the air-fuel ratio control valve 44 is constructed by the values of a fuel injection amount Tau used for obtaining a lean air-fuel ratio with respect to combinations of the values of the engine speed NE and a ratio of the intake air amount to the engine speed as an engine load, Q/NE. The setting of the air-fuel ratio in the first map Map-A is such that the value of the air-fuel ratio is increased to obtain a leaner air-fuel mixture, in accordance with an increase in the supercharging pressure, as shown in FIG. 6(a). A map interpolation calculation is carried out to obtain a value of the fuel injection amount Tau which corresponds to the detected value of the engine speed NE calculated from the spacing of the 30 degree crank angle signals from the second crank angle sensor 52 and the ratio of the intake air amount to the engine speed, Q/NE.

When it is determined that the air-fuel ratio control valve 44 is not fully open, i.e., the engine is now in a condition whereat the theoretical air-fuel ratio should be obtained, the routine goes from step 92 to step 96 and a map interpolation calculation of the fuel injection amount T is carried out, based on a second map Map-B. This map Map-B for the partially throttled condition of the air-fuel ratio control valve 44 is constructed by the values of the fuel injection amount Tau used for obtaining the theoretical air-fuel ratio with respect to combinations of the values of the engine speed NE and a ratio of the intake air amount to the engine speed as an engine load, Q/NE. As in step 94, a map interpolation calculation is carried out to obtain a value of the fuel injection amount Tau which corresponds to the detected value of the engine speed NE calculated from the spacing of the 30 degree crank angle signals from the second crank angle sensor 52 and the ratio of the intake air amount to the engine speed, Q/NE.

At step 98, it is determined if this timing is that for executing the fuel injection for the first cylinder. This determination is carried out, as is well known, by a counter which is cleared by an input of a pulse signal at every 720 degrees rotation of the crank shaft, from the first crank angle sensor 51, and incremented at each input of pulse signals output at each 30 degrees rotation from the second crank angle sensor 52. When it is determined that the present timing is for the fuel injection for the first cylinder, the routine goes to step 100 where a fuel injection signal is formulated for the injector 36 to obtain the fuel injection amount as calculated at step 94 or 96. Similarly, when it is determined that the present timing is for a fuel injection for the second, third or fourth cylinders, at step 102 or 106, the routine goes from step 104, 108 or 110, so that a fuel injection signal for the injector 36 for the second, third or fourth cylinder is calculated, to obtain a calculated injected fuel amount.

As described above, according to an internal combustion engine of the present invention fed by a gasoline fuel, the air-fuel ratio is controlled to a super lean side when the engine is under the high load condition, whereby the turbocharger as a supercharger can obtain an effective supercharging effect. A lean air-fuel ratio control in the supercharging condition allows the fuel consumption efficiency to be greatly increased while preventing an excessive heating of the catalytic converter. When the engine is under the supercharging condition, the air-fuel ratio according to the present invention is between 18 to 23, under which condition it is difficult for a usual internal combustion engine to obtain a stable combustion. To obtain a stable combustion under such an ultra lean air fuel mixture, the supercharging pressure is controlled to obtain a supercharging pressure ratio of at least 1.5, preferably between 2.0 to 2.5. In the prior art lean air-fuel ratio internal combustion engine, the air-fuel ratio which allows the obtaining of a stable combustion at the middle and high load is highest in the range of between 15 to 17, but this range of the air-fuel ratio causes the catalytic converter 54 to be easily overheated, so that the air-fuel ratio is controlled to the rich side in a range of between 10 to 11, which causes the fuel consumption efficiency to be worsened. Contrary to this, according to the present invention, a supercharging operation which is much stronger than a usual supercharging operation is carried out, so that a stable super charging operation can be executed but the catalytic converter is not overheated.

FIGS. 5(a), 5(b), 5(c) and 5(d) show the engine torque, fuel consumption, exhaust temperature $T_4$, and amount of hydrocarbons (HC), respectively, with respect to the supercharging pressure $P_B$, measured at a position downstream of the compressor 30 of the turbocharger 26 when the engine speed is maintained at 3,600 revolution per minute and air-fuel ratio A/F is maintained at 21.0. As will be easily seen from these relationships, the higher the supercharging pressure the lower the amount of the HC emission, so that a stable combustion of the combustible mixture is obtained even though it is homogeneously supplied to the combustion chamber, and a high fuel consumption efficiency is obtained while obtaining a desired engine torque. It is also clear that the higher the supercharging pressure, the higher the exhaust temperature. Nevertheless, the exhaust temperature $T_4$ can be maintained below a allowable limit by suitably adjusting the values of the air-fuel ratio A/F and supercharging pressure $P_B$. In the usual supercharger system having a supercharging pressure of at most a pressure $P_B$ of 300 to 450 mmHg, it is difficult to obtain a stabilized combustion, and thus the amount of emissions of hydrocarbons is increased, and the engine torque is reduced to cause a poor acceleration performance. Contrary to this, according to the present invention, a strong supercharging operation for obtaining a pressure $P_B$ of between 700 to 1000 mmHg allows a stabilized combustion of the ultra lean air-fuel mixture to be obtained, while obtaining a required acceleration performance.

FIGS. 6(a), (b), (c) and (d) show the supercharging pressure $P_B$, the amount of emissions of hydrocarbons, the exhaust gas temperature $T_4$, and the fuel consumption with respect to the change in air-fuel ratio A/F when the engine speed NE is maintained at 3,000 revolutions per minute and a constant engine torque is maintained. As will be easily seen from these relationships, an increase in the supercharging pressure $P_B$ can obtain a lower exhaust temperature $T_4$ and reduced emission of hydrocarbons, without increasing the fuel consumption amount, if combined with an increase of the air-fuel ratio.

A mere setting of the air-fuel ratio to between 15 to 17, as in the prior art, causes the exhaust temperature $T_4$ to be greatly increased during the engine high load operation, causing the catalytic converter to be excessively heated. This is because, in the prior art, the air-fuel ratio is set to a rich side value of between 10 to 11, which causes the fuel consumption efficiency to be greatly lowered. According to the present invention, the increase in the supercharging pressure is combined with an increase in the air-fuel ratio, which prevents the exhaust gas temperature $T_4$ from being increased, as shown in FIG. 6(c), while maintaining a relatively good fuel consumption efficiency.

Figure 7A:
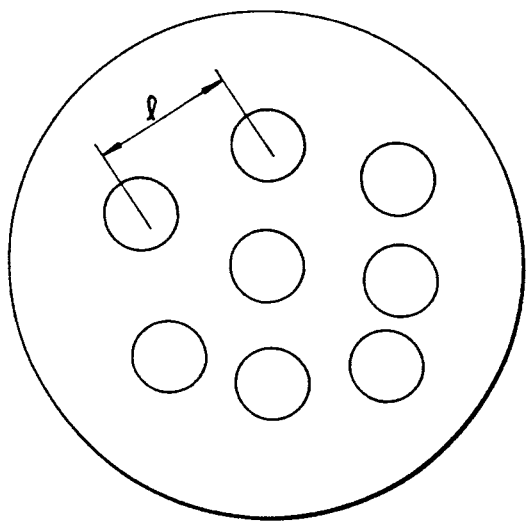
Figure 7B:
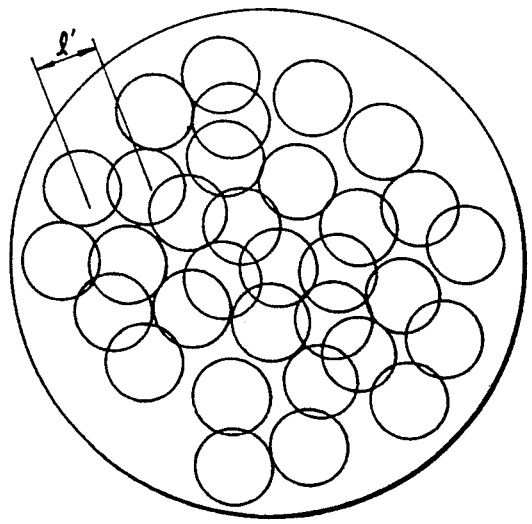

As described above, the present invention can increase the fuel consumption efficiency by obtaining a stable combustion of the super lean air-fuel mixture while increasing the supercharging pressure. A principle of the combustion of the lean air fuel mixture according to the present invention can be explained by a combustion model shown in FIGS. 7(a) and 7(b). FIG. 7(a) schematically illustrates a spatial relationship between fuel particles in a unit of volume of the lean air-fuel mixture when supercharging is not carried out. In this case, a mean distance between the adjacent fuel particles is designated by l, which is too large to obtaining a transmission of the combustion therebetween, and thus the combustion is not stable. A strong supercharging as shown in FIG. 7(b) causes the density of the fuel particles in a unit of volume of the combustible mixture to be increased, so that a mean distance is decreased as shown by l', which allows an easy transmission of a combustion between the adjacent particles. Thus, the high density supercharging allows the lean combustible mixture to be as easily burnt as if it were a rich air-fuel mixture.

Figure 8A:
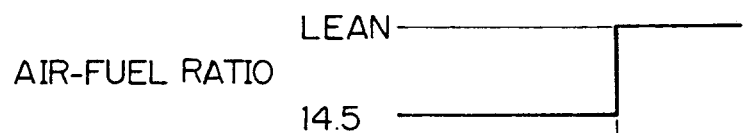
FIGS. 8($a$), ($b$) and ($c$) show the air-fuel ratio, engine torque, and operation of the air-fuel ratio control valve, respectively, at the transition zone between the theoretical air-fuel ratio zone and the lean air-fuel ratio zone.
Figure 8B:
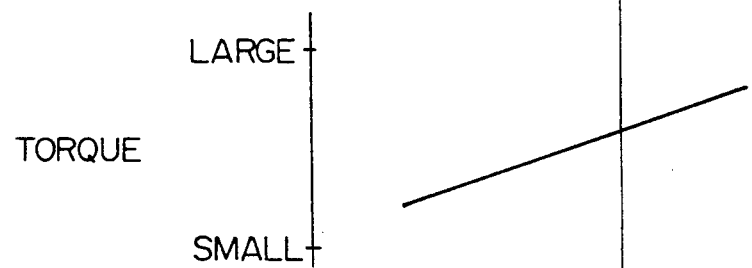
Figure 8C:
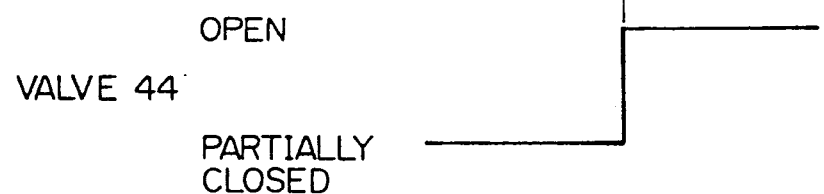

In the embodiment, the air-fuel ratio control valve 44 is moved between the partially closed position (solid line in FIG. 1) and the fully open position (dotted line 44') at the transition zone between the theoretical air-fuel ratio zone and the lean zone. Furthermore, the maps Map-A and Map-B at the transition zone are set to have the same fuel amount value at the transition zone. As a result, a continuous change of the engine torque can be obtained at the transition zone, as shown by FIG. 8(b), to obtain a desired acceleration characteristic.

Although the present invention is described with reference to the attached drawings, many modifications and changes can be made by those skilled in this art without departing from the scope and spirit of the invention.

We claim:

1. A supercharged spark ignition internal combustion engine, comprising:
   an engine body;
   an intake line for supplying intake air into the engine body;
   means for supplying fuel into the intake line for generating a combustible mixture;
   the intake line being adapted for a generation of a homogeneous flow of a combustible mixture introduced into the engine body;
   supercharging means arranged in the intake line for forcibly supplying intake air into the engine;
   an exhaust line for removing resultant exhaust gas from the engine body; and,
   means for controlling an amount of fuel supplied from said supply means to the intake line in such a manner that a lean air-fuel mixture of an air-fuel ratio larger than the theoretical air-fuel ratio is obtained at an engine high load operating area.

2. An internal combustion engine according to claim 1, wherein said supercharging means comprise a turbocharger capable of obtaining a pressure ratio of the pressure at the output of the turbocharger to that at the input thereof of larger than at least 1.5.

3. An internal combustion engine according to claim 2, wherein the pressure ratio is between 2.0 to 2.5.

4. An internal combustion engine, according to claim 1, wherein the setting of the value of the air-fuel ratio is such that the higher the degree of supercharging the leaner that air-fuel ratio of the combustible mixture, thereby obtaining a stable combustion of the lean mixture while preventing an excessive increase of the exhaust temperature.

5. A supercharged spark ignition internal combustion engine, comprising:
an engine body;
an intake line for supplying intake air into the engine body;
means for supplying fuel into the intake line for generating a combustible mixture;
the intake line being adapted for a generation of a homogeneous flow of combustible mixture introduced into the engine body;
an exhaust line for removing resultant exhaust gas from the engine body;
a turbocharger having a compressor means arranged in the intake line and a turbine means arranged in the exhaust line, said turbocharger being capable of obtaining a pressure ratio of the pressure at the output of the compressor means to that at the input thereof, of larger than at least 1.5;
first control means for controlling the amount of fuel supplied to the intake line in such a manner that a rich combustible mixture is obtained when the turbocharger cannot attain the desired supercharging effect, and;
second control means for controlling an amount of fuel supplied from said supply means to the intake line in such a manner that a lean air-fuel mixture of an air-fuel ratio larger than the theoretical air-fuel ratio is obtained at an engine high load operating area.

6. An internal combustion engine according to claim 5, further comprising a usually partially-closed valve member arranged in the intake system for controlling the amount of intake air passing through the intake line, means for detecting a transition of the engine state whereat the air-fuel ratio is controlled from the rich side to the lean side, and means for controlling the valve member means to be fully open upon the detection of the transition state, so that the amount of the intake air is changed in a step-like manner at the transition zone, to thereby obtain a change of the air-fuel ratio between the rich side and the lean side while preventing an abruptly change of the amount of the fuel at the transition zone.

7. A supercharged spark ignition internal combustion engine, comprising:
an engine body;
an intake line for supplying intake air into the engine body;
means for supplying fuel into the intake line for generating a combustible mixture;
the intake line being adapted for a generation of a homogeneous flow of the combustible mixture introduced into the engine body;
supercharging means arranged in the intake line for forcibly supplying the intake air into the engine;
an exhaust line for removing resultant exhaust gas from the engine body;
a catalytic converter arranged in the exhaust line, for purifying the exhaust gas, and;
means for controlling an amount of fuel supplied from said supply means to the intake line in such a manner that a lean air-fuel mixture of an air-fuel ratio larger than the theoretical air-fuel ratio is obtained at an engine high load operating area;
the value of the air-fuel ratio being such that the higher the degree of supercharging the leaner the air-fuel ratio of the combustible mixture, thereby obtaining a stable combustion of the lean mixture while preventing an excessive increase of the exhaust temperature at the catalytic converter.

* * * * *